US011006115B2

(12) United States Patent
Misra et al.

(10) Patent No.: US 11,006,115 B2
(45) Date of Patent: *May 11, 2021

(54) VIDEO DECODER WITH ENHANCED CABAC DECODING

(71) Applicant: Huawei Technologies Co., Ltd., Shenzhen (CN)

(72) Inventors: Kiran Misra, Vancouver, WA (US); Christopher A. Segall, Vancouver, WA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/160,359

(22) Filed: Oct. 15, 2018

(65) Prior Publication Data

US 2019/0052884 A1     Feb. 14, 2019

Related U.S. Application Data

(63) Continuation of application No. 15/861,089, filed on Jan. 3, 2018, now Pat. No. 10,136,137, which is a
(Continued)

(51) Int. Cl.
*H04N 19/00* (2014.01)
*H04N 19/13* (2014.01)
(Continued)

(52) U.S. Cl.
CPC ........... *H04N 19/13* (2014.11); *H04N 19/117* (2014.11); *H04N 19/124* (2014.11); *H04N 19/15* (2014.11);
(Continued)

(58) Field of Classification Search
CPC .... H04N 19/593; H04N 19/176; H04N 19/13; H04N 19/91; H04N 19/70; H04N 19/159;
(Continued)

(56) References Cited

U.S. PATENT DOCUMENTS

| 7,932,843 B2 | 4/2011 | Demircin et al. |
| 2005/0179572 A1 | 8/2005 | Winger |

(Continued)

FOREIGN PATENT DOCUMENTS

| CN | 1650636 A | 8/2005 |
| CN | 1725859 A | 1/2006 |

(Continued)

OTHER PUBLICATIONS

Hisao et al., "Fixed Probability coding for Intra Mode Coding," Joint CollaborativeTeam on Video Coding, (JCT VC) of ITU-T SG16 WP3 and ISO/IEC JTC1/SC29/WG11, 6th Meeting, Torino, IT, JCTVC-F426, International Telecommunication Union, Geneva, Switzerland (Jul. 14-22, 2011).

(Continued)

*Primary Examiner* — Zhihan Zhou
(74) *Attorney, Agent, or Firm* — Leydig, Voit & Mayer, Ltd.

(57) ABSTRACT

A decoder receives a bitstream containing quantized coefficients representative of blocks of video representative of a plurality of pixels and decodes the bitstream using context adaptive binary arithmetic coding. The context adaptive binary arithmetic coding decodes the current syntax element using a first mode if the current syntax element is intracoded and if selecting between a first set of probable modes and a second set of probable modes, where the first set of probable modes are more likely than the second set of probable modes. The context adaptive binary arithmetic coding decodes the current syntax element using a second mode if the current syntax element is intra-coded and if selecting among one of the second set of probable modes.

3 Claims, 9 Drawing Sheets

Related U.S. Application Data continuation of application No. 15/254,730, filed on Sep. 1, 2016, now Pat. No. 9,930,337, which is a continuation of application No. 14/691,674, filed on Apr. 21, 2015, now Pat. No. 9,516,343, which is a continuation of application No. 13/291,015, filed on Nov. 7, 2011, now Pat. No. 9,088,796.

(51) Int. Cl.

| | |
|---|---|
| H04N 19/70 | (2014.01) |
| H04N 19/159 | (2014.01) |
| H04N 19/176 | (2014.01) |
| H04N 19/91 | (2014.01) |
| H04N 19/44 | (2014.01) |
| H04N 19/593 | (2014.01) |
| H04N 19/117 | (2014.01) |
| H04N 19/124 | (2014.01) |
| H04N 19/15 | (2014.01) |
| H04N 19/46 | (2014.01) |
| H04N 19/86 | (2014.01) |
| H04N 19/11 | (2014.01) |
| H04N 19/182 | (2014.01) |

(52) U.S. Cl.
CPC ......... *H04N 19/159* (2014.11); *H04N 19/176* (2014.11); *H04N 19/44* (2014.11); *H04N 19/46* (2014.11); *H04N 19/593* (2014.11); *H04N 19/70* (2014.11); *H04N 19/86* (2014.11); *H04N 19/91* (2014.11); *H04N 19/11* (2014.11); *H04N 19/182* (2014.11)

(58) Field of Classification Search
CPC ........ H04N 19/44; H04N 19/46; H04N 19/86; H04N 19/117; H04N 19/124; H04N 19/15; H04N 19/11; H04N 19/182
See application file for complete search history.

(56) References Cited

U.S. PATENT DOCUMENTS

| | | | |
|---|---|---|---|
| 2006/0017592 | A1 | 1/2006 | Shim et al. |
| 2007/0080832 | A1 | 4/2007 | Yang et al. |
| 2008/0246637 | A1 | 10/2008 | Chen et al. |
| 2009/0080521 | A1 | 3/2009 | Marpe et al. |
| 2011/0243229 | A1 | 10/2011 | Kim et al. |
| 2012/0020580 | A1 | 1/2012 | Sasai et al. |
| 2012/0177118 | A1* | 7/2012 | Karczewicz ......... H04N 19/137 375/240.13 |
| 2012/0300839 | A1 | 11/2012 | Sze et al. |
| 2012/0328207 | A1 | 12/2012 | Sasai et al. |
| 2013/0136375 | A1 | 5/2013 | Sasai et al. |
| 2014/0192861 | A1* | 7/2014 | Chuang ............... H03M 7/4018 375/240.02 |
| 2015/0271518 | A1 | 9/2015 | Sato et al. |

FOREIGN PATENT DOCUMENTS

| | | |
|---|---|---|
| CN | 1949873 A | 4/2007 |
| CN | 102231830 A | 11/2011 |
| WO | 2009029797 A1 | 3/2009 |
| WO | 2010087157 A1 | 8/2010 |
| WO | 2011031332 A1 | 3/2011 |
| WO | 2011127403 A1 | 10/2011 |
| WO | 2013017092 A1 | 2/2013 |

OTHER PUBLICATIONS

Vadim et al.,"Utilisation of CABAC equal probability mode for intra modes coding," (JCT-VC) of ITU-T SG16 WP3 and ISO/IEC JTC1/SC29/WG11, 6th Meeting,Torino, IT, JCTVC-F376, International Telecommunication Union, Geneva, Switzerland (Jul. 14-22, 2011).

Misra et al, "Using CABAC Bypass Mode for Coding Intra Prediction Mode", JointCollaborative Team on Video Coding of ITU-T SG16 WP3 and ISO/IECJTC1/SC29/WG11, 7th Meeting, JCTVC-G707, International Telecommunication Union, Geneva, Switzerland (Nov. 21-30, 2011).

Marpe et al., "Context-Based Adaptive Binary Arithmetic Coding in the H.264/AVC Video Compression Standard" IEEE Transactions on Circuits and Systems for VideoTechnology, vol. 13, Issue 7, Institute of Electrical and Electronics Engineers, NewYork, New York (Jul. 2003).

Kumakura et al., "Fixing the number of mpm candidates," Joint Collaborative Team onVideo Coding (JCT-VC) of ITU-T SG16 WP3 and ISO/IEC JTC1/SC29/WG11, 6thMeeting,Torino, IT, JCTVC-F340, International Telecommunication Union, Geneva, Switzerland (Jul. 14-22, 2011).

Wiegand et al., "WD3: Working Draft 3 of High-Efficiency Video Coding," JointCollaborative Team on Video Coding (JCT-VC) of ITU-T SG16 WP3 and ISO/IECJTC1/SC29/WG11,Version 3, JCTVC-E603, International Telecommunication Union, Geneva, Switzerland (Mar. 2011).

Che et al., "Inter modes for screen content coding" Joint Collaborative Team on VideoCoding, (JCT-VC) of ITU-T SG16 WP3 and SO/IEC JTC1/SC29/WG11, 6th Meeting,Torino, IT, JCTVC-F148, International Telecommunication Union, Geneva, Switzerland (Jul. 14-22, 2011).

Chuang et al., "Reducing Line Buffers for Motion Data and CABAC," Joint CollaborativeTeam on Video Coding (JCT-VC) of ITU-T SG16 WP3 and ISO/IEC JTC1/SC29/WG11,6th Meeting, Torino, IT, JCTVC-F060, (Jul. 14-22, 2011).

Seregin et al., "Binarisation modification for last position coding," Joint CollaborativeTeam on Video Coding (JCT-VC) of ITU-T SG16 WP3 and ISO/IEC JTC1/SC29/WG11,6thMeeting, Torino, IT, JCTVC-F375, International Telecommunication Union, Geneva, Switzerland (Jul. 14-22, 2011).

Sze et al., "Reduction in contexts used for signiticant_coeff_flag and coefficient level," JointCollaborative Team on Video Coding (JCT-VC) of ITU-T SG16 WP3 and ISO/IECJTC1/SC29/WG11, 6th Meeting, Torino, IT, JCTVC-F132, International Telecommunication Union, Geneva, Switzerland (Jul. 14-22, 2011).

Sze et al., "Simplified MVD context selection (Extension of E324)" Joint CollaborativeTeam on Video Coding (JCT-VC) of ITU-T SG16 WP3 and ISO/IEC JTC1/SC29/WG11, 6th Meeting, Torino, IT, JCTVC-F133, International Telecommunication Union, Geneva, Switzerland (Jul. 14-22, 2011).

Sasai et al, "Modified Context Derivation for Complexity reduction," Joint CollaborativeTeam on Video Coding (JCT-VC) of ITU-T SG16 WP3 and ISO/IEC JTC1/SC29/WG11,6th Meeting, Torino, IT, JCTVC-F429, International Telecommunication Union, Geneva, Switzerland (Jul. 14-22, 2011).

Nguyen et al., "Modified binarization and coding of MVD for PIPE/CABAC," JointCollaborative Team on Video Coding (JCT-VC) of ITU-T SG16 WP3 and ISO/IECJTC1/SC29/WG11, 6th Meeting, Torino, IT, JCTVC-F455, International Telecommunication Union, Geneva, Switzerland (Jul. 14-22, 2011).

Chen et al.,"Simplified context model selection for block level syntax coding," JointCollaborative Team on Video Coding (JCT-VC) of ITU-T SG16 WP3 and ISO/IECJTC1/SC29/WG11, 6th Meeting, Torino, IT, JCTVC-F497, International Telecommunication Union, Geneva, Switzerland (Jul. 14-22, 2011).

Chien et al.,"Memory and Parsing Friendly CABAC Context," Joint Collaborative Teamon Video Coding (JCT-VC) of ITU-T SG16 WP3 and ISO/IECJTC1/SC29/WG11, 6thMeeting, Torino, IT, JCTVC-F606, International Telecommunication Union, Geneva, Switzerland (Jul. 14-22, 2011).

Sze,"BoG report on context reduction for CABAC," Joint Collaborative Team on VideoCoding (JCT-VC) of ITU-T SG16 WP3 and ISO/IEC JTC1/SC29/WG11, 6th Meeting,Torino, IT, JCTVC-F746, International Telecommunication Union, Geneva, Switzerland (Jul. 14-22, 2011).

(56) References Cited

OTHER PUBLICATIONS

Bross et al.,"WD4: Working Draft 4 of High-Effienciency Video Coding," JointCollaborative Team on Video Coding (JCT-VC) of ITU-T SG16 WP3 and ISO/IECJTC1/SC29/WG11, 6th Meeting, Torino, IT, JCTVC-F803_d1, International Telecommunication Union,Geneva, Switzerland (Jul. 14-22, 2011).
"Series H: Audiovisual and Multimedia Systems, Infrastructure of audiovisual services—Coding of moving video, Advanced video coding for generic audiovisual services." ITU-T H.264, International Telecommunication Union, Geneva, Switzerland (Mar. 2010).
Yeo et al., "Non-CE6: On intra prediction mode coding," Joint Collaborative Team onVideo Coding (JCT-VC) of ITU-T SG16 WP3 and ISO/IEC JTC1/SC29/WG11, 7thMeeting, XP030110137, International Telecommunication Union, Geneva, Switzerland, Document JCTVC-G153 (Nov. 21-30, 2011).
IN/3477/CHENP/2014, Office Action, dated Nov. 4, 2019.
U.S. Appl. No. 13/291,015, filed Nov. 7, 2011.
U.S. Appl. No. 14/691,674, filed Apr. 21, 2015.
U.S. Appl. No. 15/254,730, filed Sep. 1, 2016.
U.S. Appl. No. 15/861,089, filed Jan. 3, 2018.
Kuo et al., "A Low-Power High-Performance H.264/AVC Intra-Frame Encoder for 1080pHD Video," IEEE Transactions on Very Large Scale Integration (VLSI) Systems, vol. 19, No. 6, pp. 925-938, Institute of Electrical and Electronics Engineers, New York, New York (Jun. 2011).
Chen Yicen et al., "Design of an Unified Entropy IP for H.264 CAVLC/CABAC Decoding," National Chiao Tung University, Institute of Computer Science and Engineering, Hsinchu, Taiwan, Republic of China, total 144 pages (Jul. 2008). With English abstract.
Tan et al., "CE14.1: Results for DOCOMO's proposal and cross verification of MediaTek's implementation for the most probable mode signalling for luma," Joint Collaborative Team on Video Coding (JCT-VC) of ITU-T SG16 WP3 and ISO/IEC JTC1/SC29/WG11, 5th Meeting: Geneva, CH, JCTVC-E131, m19647, total 8 pages (Mar. 16-23, 2011).
Chuang et al., "Luma Intra Prediction Mode Coding," Joint Collaborative Team on Video Coding (JCT-VC) of ITU-T SG16 WP3 and ISO/IEC JTC1/SC29/WG11, 6th Meeting: Torino, IT, JCTVC-F062, total 5 pages (Jul. 14-22, 2011).
Francois et al., "Modified Intra Mode Coding," Joint Collaborative Team on Video Coding (JCT-VC) of ITU-T SG16 WP3 and ISO/IEC JTC1/SC29/WG11, 6th Meeting: Torino, JCTVC-F269, total 8 pages (Jul. 14-22, 2011).
Kumakura et al., "Intra prediction mode coding based on direction difference," Joint Collaborative Team on Video Coding (JCT-VC) of ITU-T SG16 WP3 and ISO/IEC JTC1/SC29/WG11, 6th Meeting: Torino, IT, JCTVC-F339, total 13 pages (Jul. 14-22, 2011).
Seregin et al., "Intra mode parsing without access neighbouring information," Joint Collaborative Team on Video Coding (JCT-VC) of ITU-T SG16 WP3 and ISO/IEC JTC1/SC29/WG11, 6th Meeting: Torino, IT, JCTVC-F378, total 16 pages (Jul. 14-22, 2011).
La et al., "Most Probable Mode-Based Fast 4 x 4 Intra—Prediction in H.264/AVC," IEEE, total 4 pages, Institute of Electrical and Electronics Engineers, New York, New York (2008).

* cited by examiner

VIDEO DECODER WITH ENHANCED CABAC DECODING

CROSS-REFERENCE TO RELATED APPLICATIONS

This application is a continuation of U.S. patent application Ser. No. 15/861,089, filed on Jan. 3, 2018, which is a continuation of U.S. patent application Ser. No. 15/254,730, filed on Sep. 1, 2016, now U.S. Pat. No. 9,930,337, which is a continuation of U.S. patent application Ser. No. 14/691,674, filed on Apr. 21, 2015, now U.S. Pat. No. 9,516,343, which is a continuation of U.S. patent application Ser. No. 13/291,015, filed on Nov. 7, 2011, now U.S. Pat. No. 9,088,796. The afore-mentioned patent applications are hereby incorporated by reference in their entireties.

BACKGROUND

Embodiments of the present invention relate to image decoding with enhanced CABAC for encoding and/or decoding.

Existing video coding standards, such as H.264/AVC, generally provide relatively high coding efficiency at the expense of increased computational complexity. As the computational complexity increases, the encoding and/or decoding speeds tend to decrease. Also, the desire for increased higher fidelity tends to increase over time which tends to require increasingly larger memory requirements and increasingly more complicated processing.

Referring to FIG. 1, many decoders (and encoders) receive (and encoders provide) encoded data for blocks of an image. Typically, the image is divided into blocks and each of the blocks is encoded in some manner, such as using a discrete cosine transform (DCT), and provided to the decoder. The decoder receives the encoded blocks and decodes each of the blocks in some manner, such as using an inverse discrete cosine transform.

Video coding standards, such as MPEG-4 part 10 (H.264), compress video data for transmission over a channel with limited frequency bandwidth and/or limited storage capacity. These video coding standards include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex.

A context adaptive binary arithmetic coding (CABAC) based encoding and/or decoding technique is generally context adaptive which refers to (i) adaptively coding symbols based on the values of previous symbols encoded and/or decoded in the past and (ii) context, which identifies the set of symbols encoded and/or decoded in the past used for adaptation. The past symbols may be located in spatial and/or temporal adjacent blocks. In many cases, the context is based upon symbol values of neighboring blocks.

The context adaptive binary arithmetic coding (CABAC) encoding technique includes coding symbols using the following stages. In the first stage, the CABAC uses a "binarizer" to map input symbols to a string of binary symbols, or "bins". The input symbol may be a non-binary valued symbol that is binarized or otherwise converted into a string of binary (1 or 0) symbols prior to being coded into bits. The bins can be coded into bits using either a "bypass encoding engine" or a "regular encoding engine".

For the regular encoding engine in CABAC, in the second stage a probability model is selected. The probability model is used to arithmetic encode one or more bins of the binarized input symbols. This model may be selected from a list of available probability models depending on the context, which is a function of recently encoded symbols. The probability model stores the probability of a bin being "1" or "0". In the third stage, an arithmetic encoder encodes each bin according to the selected probability model. There are two sub-ranges for each bin, corresponding to a "0" and a "1". The fourth stage involves updating the probability model. The selected probability model is updated based on the actual encoded bin value (e.g., if the bin value was a "1", the frequency count of the "1"s is increased). The decoding technique for CABAC decoding reverses the process.

For the bypass encoding engine in CABAC, the second stage involves conversion of bins to bits omitting the computationally expensive context estimation and probability update stages. The bypass encoding engine assumes a fixed probability distribution for the input bins. The decoding technique for CABAC decoding reverses the process.

The CABAC encodes the symbols conceptually using two steps. In the first step, the CABAC performs a binarization of the input symbols to bins. In the second step, the CABAC performs a conversion of the bins to bits using either the bypass encoding engine or the regular encoding engine. The resulting encoded bit values are provided in the bitstream to a decoder.

The CABAC decodes the symbols conceptually using two steps. In the first step, the CABAC uses either the bypass decoding engine or the regular decoding engine to convert the input bits to bin values. In the second step, the CABAC performs de-binarization to recover the transmitted symbol value for the bin values. The recovered symbol may be non-binary in nature. The recovered symbol value is used in remaining aspects of the decoder.

As previously described, the encoding and/or decoding process of the CABAC includes at least two different modes of operation. In a first mode, the probability model is updated based upon the actual coded bin value, generally referred to as a "regular coding mode" The regular coding mode, requires several sequential serial operations together with its associated computational complexity and significant time to complete. In a second mode, the probability model is not updated based upon the actual coded bin value, generally referred to as a "bypass coding mode". In the second mode, there is no probability model (other than perhaps a fixed probability) for decoding the bins, and accordingly there is no need to update the probability model which reduces the computational complexity of the system.

The foregoing and other objectives, features, and advantages of the invention will be more readily understood upon consideration of the following detailed description of the invention, taken in conjunction with the accompanying drawings.

DETAILED DESCRIPTION

Figure 1:
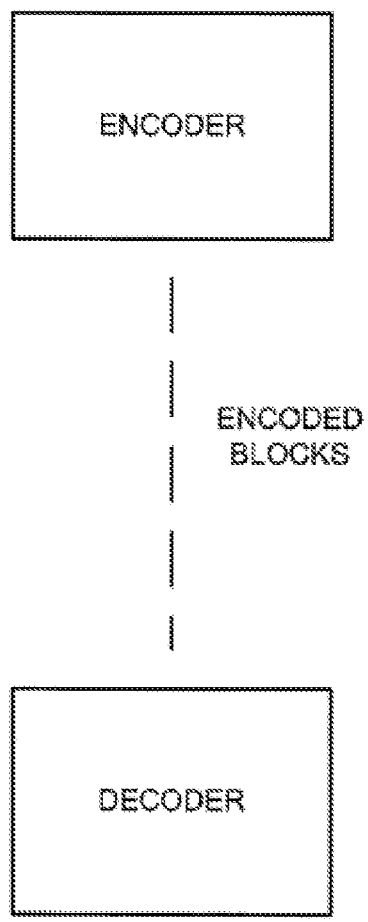
FIG. 1 illustrates an encoder and a decoder.
Figure 2:
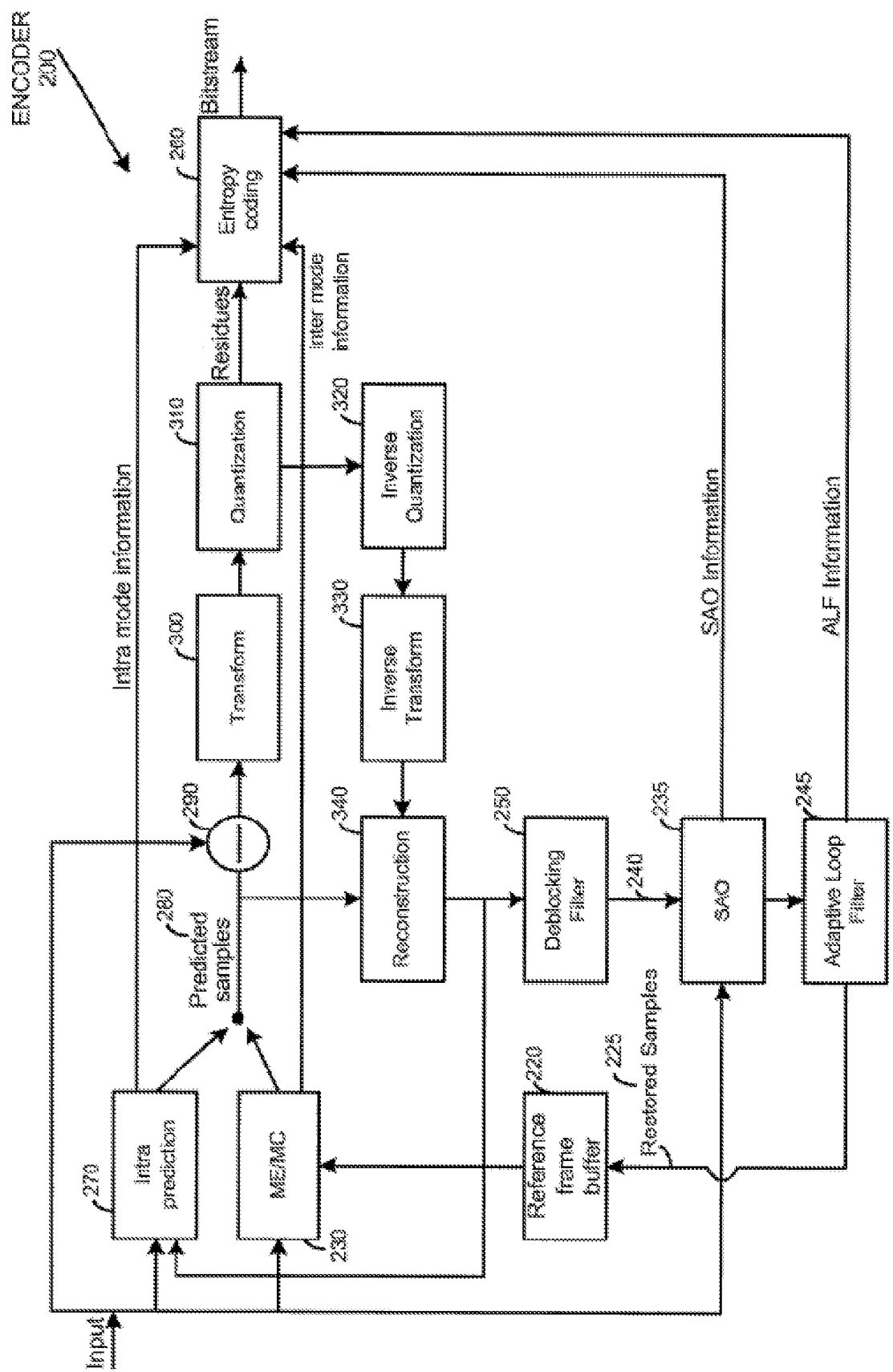
FIG. 2 illustrates an encoder.

Referring to FIG. 2, an exemplary encoder 200 includes an entropy coding block 260, which may include a CABAC, receives inputs from several different other aspects of the encoder 200. One of the inputs to the entropy coding block 260 is SAO information from a sample adaptive offset (SAO) block 235. Another of the inputs to the entropy coding block 260 is ALF information from an adaptive loop filter 245. Another of the inputs to the entropy coding block 260 is inter mode information from a motion estimation/motion compensation (ME/MC) block 230. Another of the inputs to the entropy coding block 260 is intra mode information from an intra prediction block 270. Another of the inputs to the entropy coding block 260 are residues from a quantization block 310. The entropy coding block 260 provides an encoded bitstream. This information provided to the entropy coding block 260 may be encoded in the bitstream. The SAO block 235 provide samples to the adaptive loop filter 245 which provides restored samples 225 to a reference frame buffer 220 which provides data to the motion estimation/motion compensation (ME/MC) block 230. Deblocked samples 240 from a deblocking filter 250 are provided to the SAO block 235. As with many encoders, the encoder may further include the intra-prediction block 270 where predicted samples 280 are selected between the intra prediction block 270 and the ME/MC block 230. A subtractor 290 subtracts the predicted samples 280 from the input. The encoder 200 also may include a transform block 300, an inverse quantization block 320, an inverse transform block 330, and a reconstruction block 340.

Figure 3:
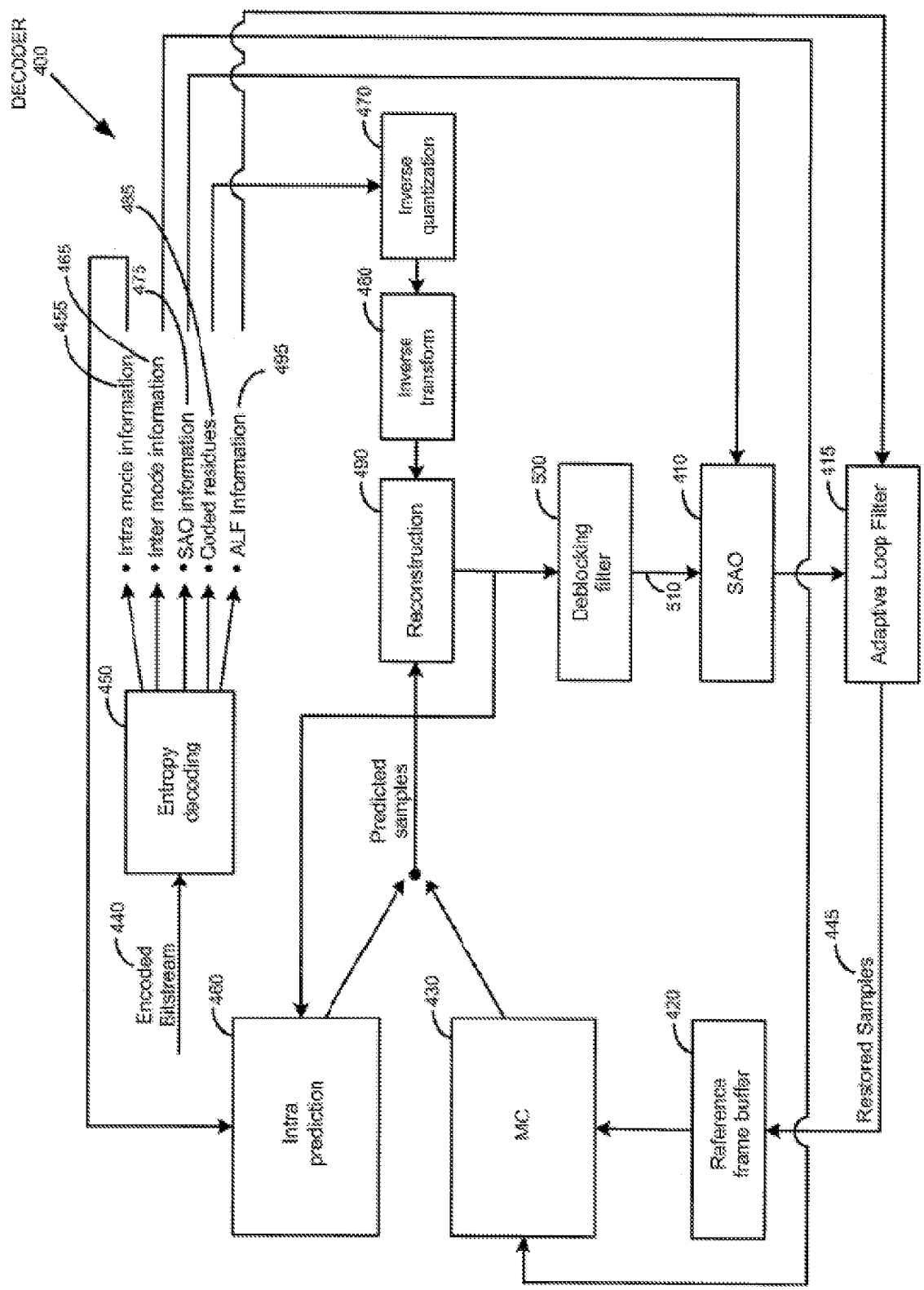
FIG. 3 illustrates a decoder.

Referring to FIG. 3, an associated decoder 400 for the encoder of FIG. 2 may include an entropy decoding block 450, which may include a CABAC. The entropy decoding block 450 receives an encoded bitstream 440 and provides data to different aspects of the decoder 400. The entropy decoding block 450 may provide intra mode information 455 to an intra prediction block 460. The entropy decoding block 450 may provide inter mode information 465 to the MC block 430. The entropy decoding block 450 may provide ALF information 495 to the adaptive loop filter 415. The entropy decoding block 450 may provide SAO information 475 to the SAO block 410. The entropy decoding block 450 may provide coded residues 485 to an inverse quantization block 470, which provides data to an inverse transform block 480, which provides data to a reconstruction block 490, which provides data to the intra prediction block 460 and/or a deblocking filter 500. The sample adaptive offset (SAO) block 410 that provides samples to an adaptive loop filter 415 which provides restored samples 445 to a reference frame buffer 420 which provides data to the motion compensation (MC) block 430. The deblocking filter 500 provides deblocked samples 510 to the SAO block 410.

Figure 4:
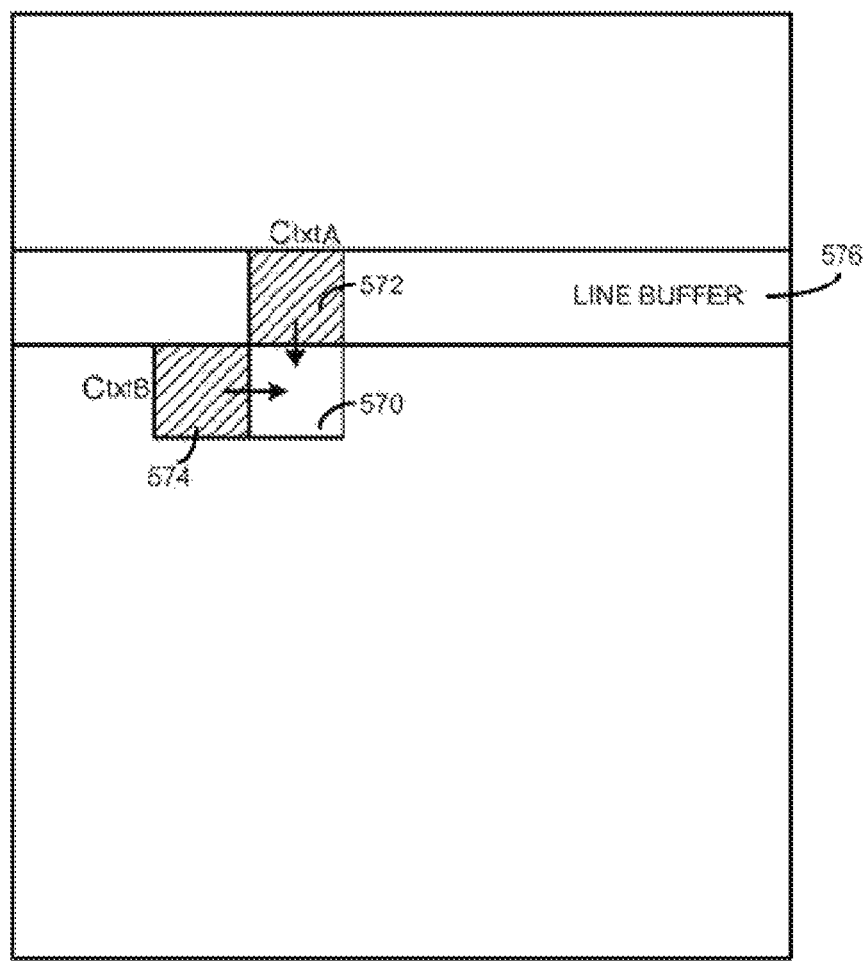
FIG. 4 illustrates context decoding for CABAC.
Figure 5:
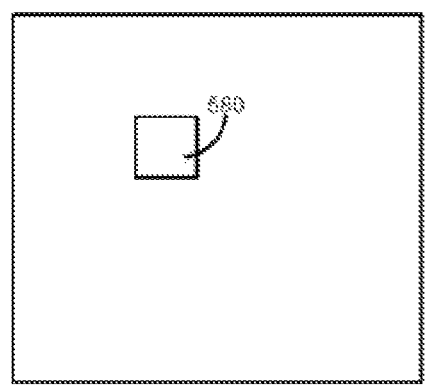
FIG. 5 illustrates bypass decoding for CABAC.
Figure 6:
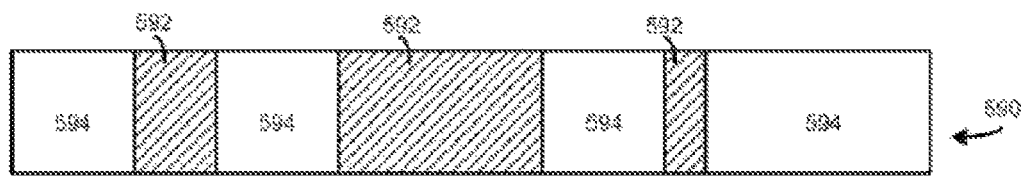
FIG. 6 illustrates a bitstream with a subset of symbols coded using a bypass coding mode and another subset of symbols coded using regular coding mode.

Referring to FIG. 4, a graphical illustration is shown of selecting a probability model when using a CABAC regular decoding engine to decode a bin 570 and using neighboring contexts. The context is determined as a function of the decoded symbol CtxtA 572 and decoded symbol CtxtB 574, where CtxtA was stored in a line buffer 576. The context determines the probability model used to decode 570. In contrast, referring to FIG. 5, a graphical illustration is shown of selecting a probability mode when using a CABAC bypass decoding engine to decode a symbol 580. The selected probability mode does not depend on context information. Referring to FIG. 6, a bitstream 590 includes a set of binarized syntax elements 592 coded using the bypass coding engine, and a set of binarized syntax elements 594 coded using the regular coding engine and therefore requiring probability model updates in the CABAC. As it may be observed, the requirement for a line buffer is eliminated when using the bypass coding mode, the amount of memory required is reduced, the probability model update is not performed, and the throughput of the CABAC is increased.

The CABAC decodes the video based upon a complex set of potential encoding configurations. For example, the coding configurations may include motion compensated blocks and intra-prediction blocks. The encoding and decoding of motion compensated blocks of video tend to be relatively complicated and tend to generally benefit from the added complexity afforded by the CABAC regular coding engine. Part of the complexity, in addition to the decoding technique, is the storing of information on which the symbols depends and the need for updating the probability model mechanism each time a symbol is encoded and/or decoded. The encoding and decoding of intra predicted blocks of video tend to be relatively less complicated and tend to generally benefit to a lesser degree from the added complexity afforded by the CABAC regular coding engine. In this case, the bypass coding mode tends to reduce the need for additional storage, determining the context, and the updating of the probability model, without meaningfully impacting compression efficiency. In particular, some symbols in the bitstream are generally equally likely to contain bins with values of 0 or 1 after binarization. Moreover, at the same time such symbols do not result in meaningful compression benefits due to the context adaptation of the CABAC regular coding engine. It is speculated that this lack of meaningful compression benefits is likely due to rapid fluctuations in their probability distribution.

Figure 7:
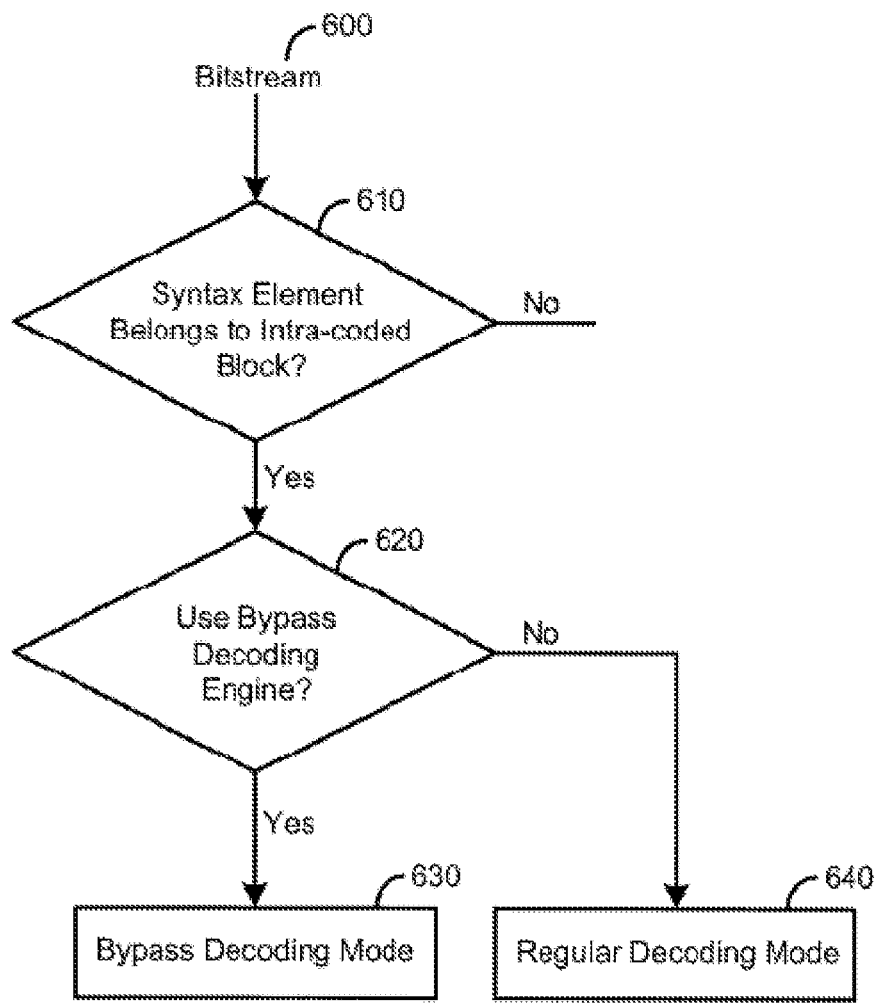
FIG. 7 illustrates a decoding technique with a bypass decoding mode and a regular decoding mode.

Referring to FIG. 7, in one embodiment the CABAC, which may be included as part of the entropy decoding 450 of the decoder 400, receives bits originating in the bitstream 600. For those syntax elements, or symbols, belonging to a block which was intra coded 610, it may be determined, whether the particular symbol is suitable to use the bypass decoding engine 620, if the impact on coding efficiency does not justify the additional computational complexity. If the syntax element, or symbol, belonging to an intra coded block 610 is suitable for using the bypass decoding engine, then the binarized symbol is decoded using the bypass decoding mode 630. If the syntax element, or symbol, belonging to an intra coded block 610 is not suitable for using the bypass decoding engine, then the binarized symbol is decoded using the regular decoding mode 640.

Figure 8:
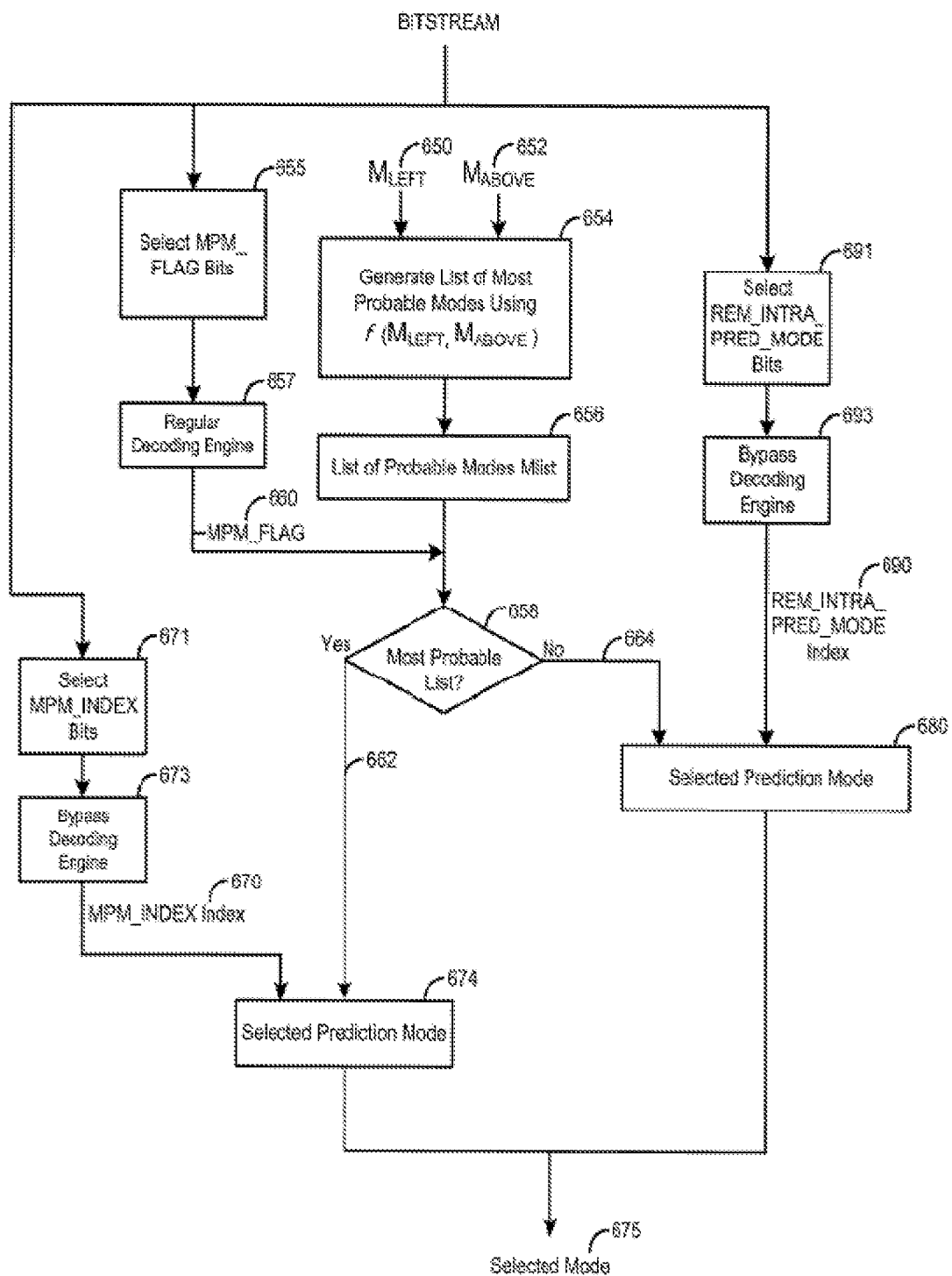
FIG. 8 illustrates a decoding technique for symbols of a block having a syntax element type corresponding to being intra encoded.

Referring to FIG. 8, the CABAC may receive a symbol 570 to be decoded from the bitstream. A symbol 574 belonging to a block to the left of the current block has previously been decoded and the prediction mode for the left block has been determined as Mleft 650, where prediction mode identifies a method for predicting the pixel values within a block using previously decoded data. Similarly, a symbol 572 belonging to a block above the current block has previously been decoded and the prediction mode for the above block has been determined as Mabove 652. In most situations, the prediction mode for the current block is not expressly transmitted in the bitstream, but is instead determined based upon a likelihood of previously determined prediction modes, such as Mleft and Mabove, as previously described. Accordingly, a function generates a list of probable modes using f(Mleft, Mabove) 654 based upon the Mleft 650 and the Mabove 652, which may be referred to as Mlist=f(Mleft, Mabove). The result is a list of probable modes Mlist 656.

In one embodiment, the list of probable modes Mlist 656 generated by the function generate list of most probable modes using f (Mleft, Mabove) 654 may include two lists of prediction modes (or otherwise combined in a single list), a first list including the "most probable modes" and a second list including the "not most probable modes". From the bitstream the system may select MPM_FLAG bits 655, which indicate a suitability for using the regular decoding engine 657, and therefore a syntax element, such as MPM_FLAG 660, indicating whether the prediction mode for the current block is in the "most probable mode list" (typically signaled with a "1") or is in the "not most probable mode list" (typically signaled with a "0"). A comparison 658 with the MPM_FLAG 660 for the current block may be used to determine whether the suitable prediction mode is in the "most probable mode list" 662 or in the "not most probable mode list" 664. In the event that the MPM_FLAG 660 for the current block indicates that the prediction mode is in the "most probable mode list" 662, and in the event that there exists only a single prediction mode in the "most probable mode list", then that is a selected prediction mode 674 for the current block. The results of the selected prediction mode 674 is provide as a selected mode 675 as the output. In the event that the MPM_FLAG 660 for the current block indicates that the prediction mode is in the "most probable mode list" 662, and in the event that there exists only two prediction modes in a "most probable mode list" index, then a MPM_INDEX index 670 may be used to signal the selected prediction mode 674 to select between the two prediction modes and provide the selected mode 675 as an output. The MPM_INDEX index 670 may be determined by the system from the bitstream by selecting MPM_INDEX bits 671, which indicate a suitability for using the bypass decoding engine 673, and therefore provide the MPM_Index index 670. This process of selecting among the entries of the "most probable mode list" 662 may be expanded with additional bit allocation to MPM_INDEX index 670 to distinguish between additional different modes.

As noted, based upon the past bins in the bitstream, the CABAC may determine the probability that the current bin will be a "1" or a "0". The selection between the "within the most probable list" and "not within the most probable list", is a decision that has a meaningful impact on the coding efficiency of the CABAC, and accordingly having an updated probability is beneficial.

In the event that the MPM_FLAG 660 for the current block indicates that the prediction mode is in the "not most probable mode list" 664, and in the event that there exists only a single prediction mode in the "not most probable mode list" 664, then that is a selected prediction mode 680 for the current block. In the event that the MPM_FLAG 660 for the current block indicates that the prediction mode is in the "not most probable mode list" 664, and in the event that there exists only two prediction modes in a "not most probable mode list" index, then a REM_INTRA_PRED_MODE index 690 may be used to signal to the selected prediction mode 680 to select between the two prediction modes and provide the selected prediction mode 675 as an output. The REM_INTRA_PRED_MODE index 690 may be determined by the system from the bitstream by selecting REM_INTRA_PRED_MODE bits 691, which indicate a suitability for using the bypass decoding engine 693, and therefore provide the REM_INTRA_PRED_MODE index 690. In the event that the MPM_FLAG 660 for the current block indicates that the prediction mode is in the "not most probable mode list" 664, and in the event that there exists only four prediction modes in a "not most probable mode list" index, then a 2-bit REM_INTRA_PRED_MODE index 690 may be used to signal to the selected prediction mode 680 to select between the four prediction modes and provide the selected mode 675 as an output. In the event that the MPM_FLAG 660 for the current block indicates that the prediction mode is in the "not most probable mode list", and in the event that there exists only eight prediction modes in the "not most probable mode list" index, then a 3-bit REM_INTRA_PRED_MODE index 690 may be used to signal to the selected prediction mode 680 to select between the eight prediction modes and provide the selected mode 675 as an output. This process of selecting modes from the not most probable mode list may be expanded with additional bit allocation to REM_INTRA_PRED_MODE index to distinguish between the different prediction modes.

As noted, based upon the past bins in the bitstream, the CABAC may determine the probability that the current bin will be a "1" or a "0". As previously noted, the selection between the "most probable mode list" and the "not within the most probable mode list", is a decision that has a meaningful impact on the coding efficiency of the CABAC, and accordingly having an updated probability is beneficial. However, the selection among the possibilities within the "not most probable mode list" 664 has limited impact on the coding efficiency of the CABAC, and accordingly the probabilities should not be updated, thus reducing the computational complexity of the system. In most cases, the probability assigned to a particular binarized symbol that is not updated is 50%.

Figure 9:
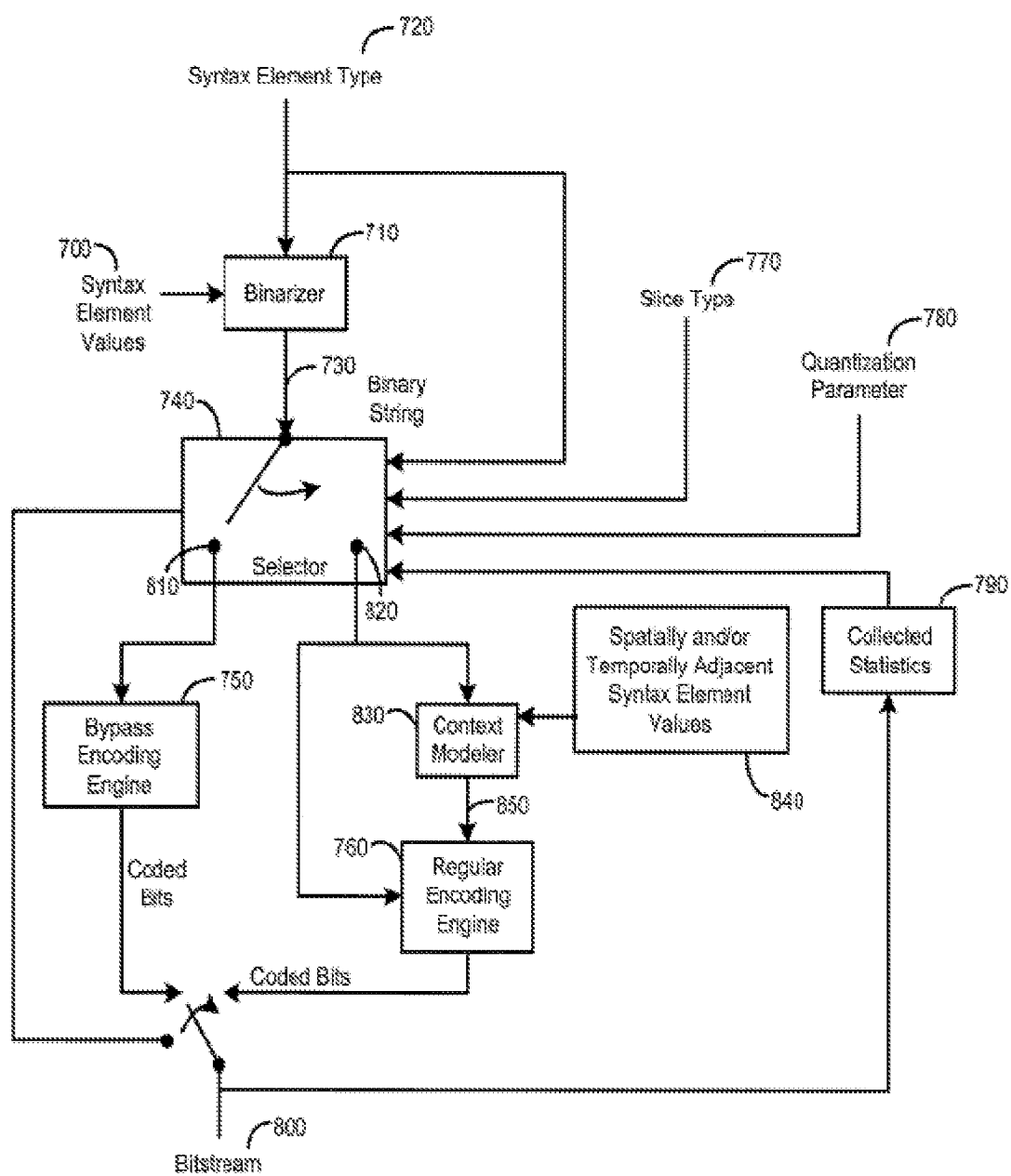
FIG. 9 illustrates a CABAC based encoder.

Referring to FIG. 9, an exemplary CABAC based encoder receives syntax elements values 700 that are normally non-binary. A binarizer 710 receives the syntax elements values 700 and based upon the syntax element type 720 generates a binary string 730. The syntax element type 720 may signal, for example, the input value corresponding to an index term derived for the current block's intra prediction mode; or the input value corresponds to a flag derived for the current block's intra prediction mode. A selector 740 selects whether to use a bypass encoding engine 750 or a regular encoding engine 760 based upon one or more inputs. One of the inputs to the selector 740 may include the syntax element type 720. Another of the inputs to the selector 740 may include a slice type 770. The slice type 770 may include, for example, an I-slice (intra-predicted slice), a P-slice (forward predicted slice), and/or a B-slice (a bi-directional predicted slice). Another of the inputs to the selector 740 may be a quantization parameter 780. For example, the statistical behavior of the binarized syntax element value may change based upon the quantization parameter, which is often related to the bit rate of the bitstream. Another one of the inputs to the selector 740 may be collected statistics 790 from the resulting bitstream 800. The collected statistics 790 facilitates the modification of the manner of encoding based upon the bitstream to further improve the encoding efficiency. If the selector 740 selects the bypass encoding mode 810, based upon one or more of the inputs, then the binary string 730 is encoded using the bypass encoding engine 750 to generate the bitstream 800. If the selector 740 selects the regular encoding mode 820, based upon one or more of the inputs, then the binary string 730 is provided to the regular encoding engine 760, this engine is the arithmetic encoder. Additionally the current probability estimate 850 is provided as input to the regular encoding engine by a context modeler 830 based upon spatially and/or temporally adjacent syntax elements 840 and binary symbols encoded in the past. The regular encoding engine 760 generates the bitstream 800. The output of the regular encoding engine 760 is used to update the probability of the context modeler 830. The selector 740 may also be used to indicate which coded bits should be included in the bitstream 800.

Figure 10:
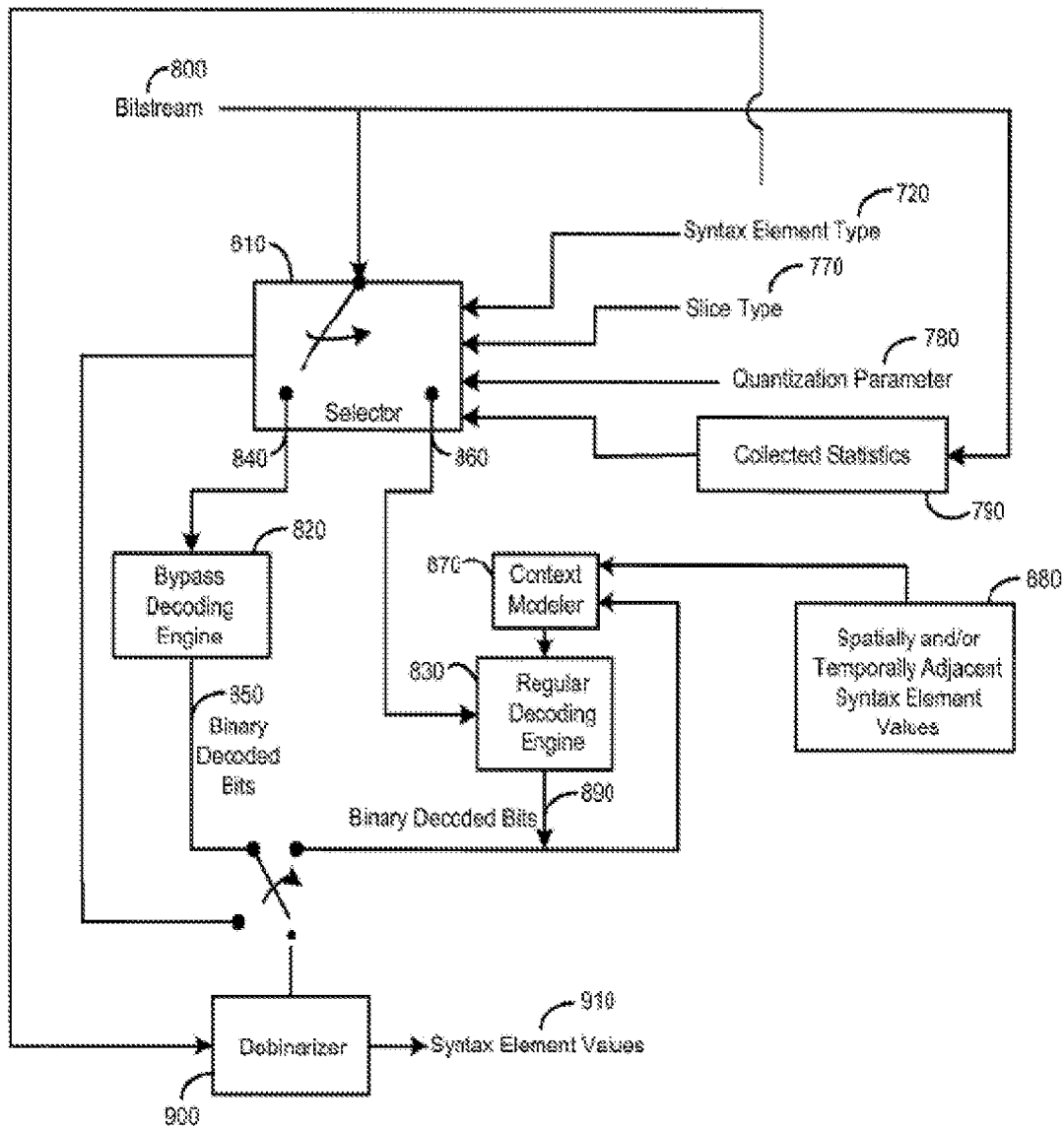
FIG. 10 illustrates a CABAC based decoder.

Referring to FIG. 10, the bitstream 800 may be received by a CABAC based decoder. A selector 810 selects whether to use a bypass decoding engine 820 or a regular decoding engine 830 based upon one or more inputs from the bitstream 800. One of the inputs to the selector 810 may include the syntax element type 720. Another one of the inputs to the selector 810 may include the slice type 770. Another one of the inputs to the selector 810 may be the quantization parameter 780. Another one of the inputs to the selector 810 may be the collected statistics 790. If the selector 810 selects the bypass decoding mode 840, based upon one or more of the inputs, then the bitstream 800 is decoded using the bypass decoding engine 820 to generate binary decoded bits 850. If the selector 810 selects the regular decoding mode 860, based upon one or more of the inputs, then the bitstream 800 is provided to the regular decoding engine 830, this engine is the arithmetic decoder. Additionally the current probability estimate 875 is provided as input to the regular decoding engine by a context modeler 870 based upon spatially and/or temporally adjacent syntax element values 880. The regular decoding engine 830 generates binary decoded bits 890. The output of the regular decoding engine 830 is used to update the probability of the context modeler 870. The selector 810 may also be used to indicate which binary decoded bits 850, 890 should be provided to a debinarizer 900. The debinarizer 900 receives the binary decoded input, together with the syntax element type 720, and provides non-binary syntax element values 910.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A decoder for decoding a prediction mode of a current block, wherein the decoder comprises a regular decoding engine and a bypass decoding engine, the regular decoding engine is used for arithmetic decoding using a context, the bypass decoding engine is used for arithmetic decoding with a bypass decoding process, and wherein the decoder is configured to:

generate a most probable mode list according to prediction modes of one or more adjacent blocks of the current block, the most probable mode list comprises one or more candidate prediction modes;

decode a first indicator using the regular decoding engine; and decode a second indicator using the bypass decoding engine to obtain the prediction mode of the current block in the event that a value of the first indicator is 1, wherein the value of the first indicator being 1 indicates the prediction mode is in the most probable mode list, and wherein the second indicator is used to indicate the prediction mode in the most probable mode list.

2. An apparatus for decoding a prediction mode of a current block, wherein the apparatus comprises: a regular decoding engine, a bypass decoding engine, a computing hardware, and a non-transitory computer-readable storage medium including computer-executable instructions executed by the computing hardware to perform a method that comprises:

generating a most probable mode list according to prediction modes of one or more adjacent blocks of the current block, the most probable mode list comprises one or more candidate prediction modes;

decoding a first indicator using the regular decoding engine; and decoding a second indicator using the bypass decoding engine to obtain the prediction mode of the current block in the event that a value of the first indicator is 1, wherein the value of the first indicator being 1 indicates the prediction mode is in the most probable mode list, and wherein the second indicator is used to indicate the prediction mode in the most probable mode list.

3. A computer program product, comprising computer executable instructions stored on a non-transitory computer-readable medium, wherein execution of the instructions by a processor causes the processor to:

generate a most probable mode list according to prediction modes of one or more adjacent blocks of the current block, the most probable mode list comprises one or more candidate prediction modes;

decode a first indicator using the regular decoding engine; and decode a second indicator using the bypass decoding engine to obtain the prediction mode of the current block in the event that a value of the first indicator is 1, wherein the value of the first indicator being 1 indicates the prediction mode is in the most probable mode list, and wherein the second indicator is used to indicate the prediction mode in the most probable mode list.

* * * * *